Jan. 22, 1957 P. W. CRIST 2,778,933
AMPLITUDE MODULATION DETECTOR WHICH IS PHASE RESPONSIVE
Filed Aug. 25, 1951 2 Sheets-Sheet 1

INVENTOR
PHILIP W. CRIST
BY
Paul B. Hunter
ATTORNEY

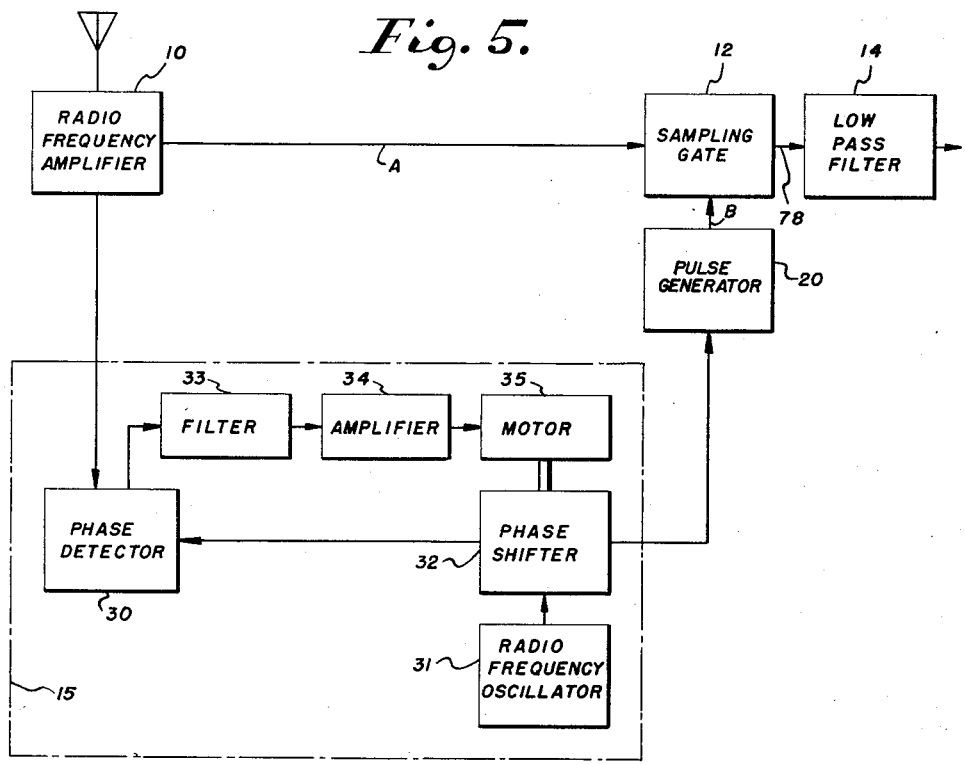

United States Patent Office 2,778,933
Patented Jan. 22, 1957

2,778,933

AMPLITUDE MODULATION DETECTOR WHICH IS PHASE RESPONSIVE

Philip W. Crist, Sea Cliff, N. Y., assignor to Sperry Rand Corporation, a corporation of Delaware Application August 25, 1951, Serial No. 243,710

4 Claims. (Cl. 250—20)

This invention relates to means for limiting noise in radio pulse receiving apparatus and more particularly to non-suppressing detectors for such apparatus.

Ordinary amplitude detection of noisy radio frequency pulses, for example by means of a diode, is limited by the well-known phenomenon that the presence of noise suppresses the average detector output.

The theory of detection of radio frequency pulses in the presence of noise indicates that a major improvement in the detection of weak signals can be obtained if successive received pulses have the same radio frequency phase. In the case of loran, for example, the phases can be maintained essentially coherent and considerable improvement in the detection of weak signals can be realized. The ordinary envelope detector such as a diode does not depend on phase and is consequently subject to a suppression phenomenon in that the average height of a series of pulses is reduced due to the presence of noise. When the carrier-to-noise ratio becomes less than about unity, the envelope detector becomes just about useless.

The present invention discloses a type of non-suppressing detector adaptable for pulse reception. It comprises primarily a synchronized electronic switch operated at the pulse repetition rate and arranged to close for a time approximately equal to one half radio frequency cycle. When the timing of this switch is controlled so that it samples the crest of a particular radio frequency cycle in the pulse, then the average of a series of samples in the presence of noise approaches the same value as would be obtained in the absence of noise.

Accordingly, a principal object of the present invention is to provide new and improved means for minimizing noise in radio receiving apparatus.

Another object of the invention is to provide a new and improved non-suppressing detector means for radio receiving apparatus.

Another object of the present invention is to provide new and improved pulse receiving means.

Another object of the present invention is to provide new and improved receiving means for pulse navigation systems.

Another object of the present invention is to provide new and improved means for radio frequency sampling detection.

Another object of the present invention is to provide a new and improved radio frequency detector responsive both to phase and amplitude of the received radio signals.

These and other objects of the invention will be apparent from the following specification and figures, of which:

Figure 3:
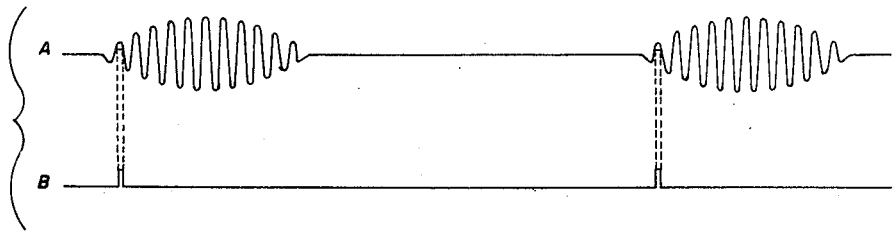
Figure 4:
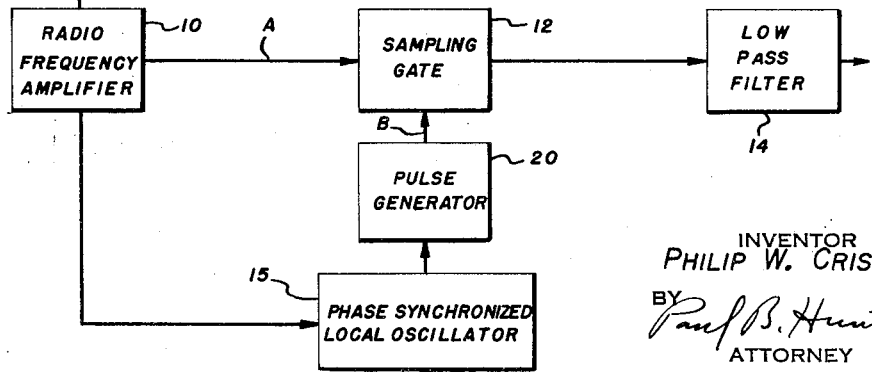

Fig. 3 comprises wave forms illustrative of the invention;

Figs. 4 and 5 are schematic block diagrams of embodiments of the invention; and

Fig. 6 is a schematic diagram of a sampling gate adapted to be used in an embodiment of the invention.

Figure 1:
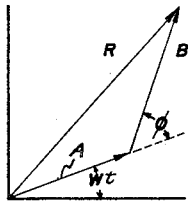
Fig. 1 is a graph illustrative of the theory of the invention.

Two important features of the suppression phenomenon in the case of conventional envelope detection are, first, that the average output of a diode detector in the presence of noise is less than in the absence of noise, and, second, that the slope of the D.-C. output characteristic approaches zero as the carrier strength approaches zero. The physical basis of these results is seen in Fig. 1 by considering that the vector sum of the carrier amplitude A plus a typical noise amplitude B is a resultant vector of length R. The average value of R, as $\phi$ takes on various values while B is held constant, will occur when $\phi$ is somewhere between the extremes of 0 and $\pi$. Thus the sides of the triangle have the relation $R < A + B$ or $R - B < A$. Averaging over various values of B, there results $R_{av} - B_{av} < A$. Now $R_{av} - B_{av}$ is the useful detector output since this is the increment when the carrier is added to the noise, and the derived inequality states that the detector output is suppressed by the noise. In other words, the increase in the detector output when the carrier is added to the noise is less than the carrier amplitude because on the average the carrier is at an angle rather than in phase.

The second important feature of the suppression phenomenon is that the D.-C. output characteristic of an envelope detector approaches zero slope as the carrier-to-noise $(C/N)$ ratio approaches zero. In other words, the output vs. input characteristic starts out with zero slope, and thus the first order response to an infinitesimal carrier is zero. This can be understood by considering a small carrier vector added to a large noise vector at a random phase angle. It will be realized on trying out various angles that to a first approximation the carrier subtracts from the noise just as much as it adds and consequently the increase in the average output when the carrier is included is essentially zero. This property may be generalized to show that any detector system, however complex, which depends on envelope magnitude without regard to the phase of the radio frequency, will have a D.-C. characteristic which starts out with zero slope. This fact is important since it implies that one must make use of phase information before one can hope for a major improvement in weak signal detection.

Non-suppressing detection by radio frequency sampling makes use of phase and amplitude information and thereby avoids the suppression phenomenon. The following development of the theory of its operation will show that (a) the average or D.-C. output of a series of samples is independent of the presence of noise, (b) the noise output is independent of the phase angle of the sampling, and (c) the optimum length of each sample is somewhat less than one half radio frequency cycle.

The voltage obtained by sampling the radio frequency is the vertical component of the resultant vector R in Fig. 1. If the sample is taken at an angle $\omega t = \theta$, this voltage is $$V = A \sin \theta + B \sin (\phi + \theta)$$

To find the average of a series of such samples all taken at the same angle $\theta$ but having various noise amplitudes and phases, it is noticed that since all the various values of $\phi$ are equally likely, the factor $\sin (\phi + \theta)$ averages zero. Thus, the average value is just $V_{av} = A \sin \theta$ and is independent of the presence of noise.

Since $A \sin \theta$ is the constant part of the expression for V, the remainder, $B \sin (\phi + \theta)$, is the alternating or noise component. The R. M. S. value of this component is $\sqrt{\overline{B^2}_{av}/2}$ and is independent of $\theta$ the phase angle of the sampling. It can be shown that this value is just the R. M. S. value of the radio frequency noise voltage.

Figure 2A:
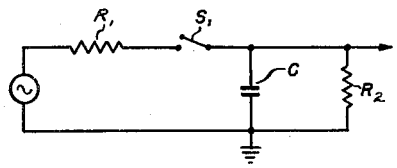
Figs. 2a, 2b and 2c show an equivalent circuit and explanatory graphs illustrative of the invention.
Figure 2B:
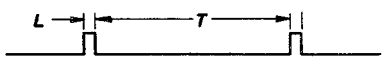
Figure 2C:
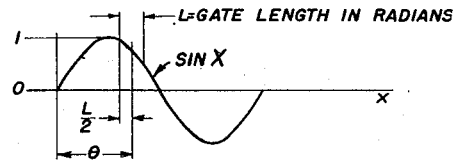

Inasmuch as the duty cycle of the radio frequency sampling process is very low, it is important to determine the gate length which will give maximum output. The calculation will deal with sampling a noise-free carrier, but it will be realized that the choice of gate length will not affect the output signal-to-noise ratio. Determination of the optimum gate length involves (a) setting up an equivalent circuit as shown in Fig. 2a (b) developing an expression for average voltage of a sample as a function of phase angle and gate length, and (c) applying this voltage to the equivalent circuit to determine the D.-C. output as a function of gate length. Fig. 2b shows the sampling pulses and Fig. 2c shows sampling of a radio frequency cycle. Based on the equivalent circuit and using the mathematical diagram of Fig. 2c, one finds that the average voltage acting during a sample is, $$E_m = \sin\theta \; \frac{\sin L/2}{L/2}$$

where $L$ = gate length in radians. For any given gate length, the output varies sinusoidally with phase angle (except, of course, when the gate is a full cycle or number of cycles long), and for a given angle the output falls off with gate length. It is assumed that the capacitor in the equivalent circuit (Fig. 2a) is large so that when equilibrium is obtained its voltage is constant and the charge leaking off through $R_2$ is balanced by the charge coming through the switch $S_1$. The resulting expression for the direct voltage output across the capacitor is $$2 \sin\theta \left( \frac{\sin L/2}{L + R_1 T/R_2} \right)$$

where T is the spacing between gates in radians. The maximum value of this output as a function of gate length L occurs when $$\tan L/2 - L/2 = \frac{R_1 T}{2 R_2}$$

The optimum gate length is somewhat less than one half radio frequency cycle, depending on resistance values in the equivalent circuit and on the time (in radians) between samples.

Fig. 3a shows wave forms of radio frequency pulses of constant repetition rate and Fig. 3b shows the locally generated sampling pulses. The figure illustrates how the locally generated pulses sample a small portion of a radio frequency cycle. It will be seen that the locally generated pulses must be carefully phased so that they will sample the same portion of the radio frequency cycle each time.

Fig. 4 shows a simplified embodiment of the invention comprising radio frequency amplifier 10, the output of which is connected to sampling gate 12, the output of which is connected to low pass filter 14. The sampling gate is adapted to be energized by sampling pulses generated by pulse generator 20, and the pulse generator is phase synchronized by the phase synchronized local oscillator 15. Details of the phase synchronized local oscillator are shown in Fig. 5. The sampling gate 12 may be an electronic switch, for instance of the four diode type. A detailed circuit of such a sampling gate is shown in Fig. 6.

The operation of the embodiment of Fig. 4 is as follows. Pulsed radio frequency signals, such as shown in Fig. 3a, are received by radio frequency amplifier 10 from which they are fed to the sampling gate 12, and to the phase synchronized local oscillator 15. The phase synchronized local oscillator triggers the pulse generator in the correct phase relationship and at the pulse repetition frequency, and the sampling pulses turn on the sampling gate for their duration, thus effectively selecting predetermined phase synchronized portions of the radio frequency cycles. The output of the sampling gate 12 will be a direct voltage proportional to the amplitude of the received radio frequency wave occurring during the sampling period. The output from sampling gate 12 is passed through a low pass filter 14 which provides an average direct voltage output.

Therefore, this arrangement provides a detector which is responsive both to the amplitude and to the phase of the received radio frequency signals. This detector eliminates a great proportion of the noise, since it only samples the radio frequency signals at predetermined moments. This type detector is non-suppressing, that is, is not subject to the suppression phenomenon, like diode detectors, and is preferably for use with coherent phase systems, such as used in loran navigation. Since the radio frequency phase of such transmissions is constant and the pulse repetition rate is constant, there is a definite relation between them, and this provides necessary characteristics for non-suppressing detection.

Fig. 5 shows details of the phase synchronized local oscillator 15. The phase synchronized local oscillator 15 may comprise a stable radio frequency oscillator 31, the output of which is adapted to be phase controlled by the incoming radio frequency signals. The output of radio frequency amplifier 10 is connected to a phase detector 30. The output of radio frequency oscillator 31 is connected to phase shifter 32, and the phase shifter output is also connected to phase detector 30. If there is any phase discrepancy between the local generator signal from oscillator 31 and the received signals from amplifier 10, the phase detector 30 will provide an error signal which is filtered by filter 33 and connected through amplifier 34 to servo motor 35. The servo motor 35 will then turn the phase shifter 32 so as to correct the discrepancy between the two inputs to the phase detector 30. Therefore, the output from phase shifter 32 to the pulse generator 20 will be in phase with the received radio frequency signals, as described in connection with Fig. 4. The remainder of Fig. 5 is exactly the same as Fig. 4. The local oscillator 31 may be synchronized successfully with the incoming signals even in the presence of considerable noise, since the radio frequency signals have a constant phase, and the noise being of a random nature tends to average out. Other well known synchronizing means may be used.

Fig. 6 shows a suitable sampling gate of a type which may be used as element 12 in the apparatus shown in Figs. 4 and 5. The following description relates to use of such a sampling gate as element 12. Signals at A and B correspond to those shown in Figs. 3a and 3b.

Pulses at B are applied to the control grid of gas tube 63 through condenser 64. Resistors 65 and 66 are serially connected across battery 67, and the junction between the resistors is connected to the control grid of tube 63 to bias the tube to cut-off. Battery 68 and resistor 69 are connected between the plate and cathode of tube 63 and serve to supply the plate current for the tube. The plate of tube 63 is connected through condenser 70 and the primary winding of pulse transformer 71 to ground. Transformer 71 is of a type adapted to produce a pulse of suitable duration.

The plates of twin diode tube 72 are connected in parallel and are connected to the parallel connected cathodes of twin diode tube 73 through the secondary of transformer 71 and the parallel combination of resistor 74 and condenser 75. Resistor 74 and condenser 75 form a high time constant network.

One cathode of tube 72 and one plate of tube 73 are connected together and received signal at A is applied thereto through condenser 76. Resistor 77 is connected between condenser 76 and ground.

The other cathode of tube 72 and the other plate of tube 73 are also connected together, and lead 78 connected thereto connects sampling gate 12 to smoothing filter 14, Fig. 5. Condenser 79 serves to maintain the output of the sampling gate substantially constant during the intervals between each sampling period.

Batteries 81 and 82 are connected in series across potentiometer 83, and the junction between the two batteries is grounded. The rotor of potentiometer 83 is connected to lead 78 through resistors 84 and 85. Resistor 86 is connected between the junction between resistors 84 and 85 and ground. Potentiometer 83 is to permit balancing of residual potentials and leakage currents in the diodes.

Variable condenser 87 is connected between the plates of tube 72 and ground to permit balancing of transients between tubes 72 and 73. To adjust condenser 87 and potentiometer 83, the lead at A is grounded, signal B is applied to the sampling gate, and then condenser 87 and potentiometer 83 are adjusted until no voltage appears between lead 78 and ground.

When each pulse at B is applied to the grid of gas tube 63 the tube becomes conducting and a surge of current flows from condenser 70 through the primary of transformer 71 and the interelectrode space between the cathode and plate of tube 63.

The secondary of transformer 71 is connected across tubes 72 and 73 through resistor 74 and condenser 75 so that the voltage pulse causes the plates of tube 72 to be of positive polarity with respect to the cathodes of tube 73; therefore, a surge of current flows through each diode section of tubes 72 and 73 and the tubes form a low impedance path between conductor at A and lead 78.

Since resistor 74 and condenser 75 form a high time-constant network, each surge of current which flows through resistor 74 places a charge on condenser 75 and the charge decays slightly between pulses. This charge causes a voltage to appear across condenser 75 which is of a magnitude slightly less than the voltage which appears across the secondary of transformer 71 during each pulse, and this voltage serves to cause the plates of tube 72 to be of negative polarity wtih respect to the cathode of tube 73 during the time intervals between pulses Fig. 3b, thereby causing tubes 72 and 73 to become nonconducting and offer a very high impedance during the time intervals between pulses Fig. 3b.

The grid and plate voltages applied to gas tube 63 are proportioned so that the flow of current through tube 63 is extinguished after the occurrence of each pulse Fig. 3b.

Thus, each pulse Fig. 3b causes a pulse of current to flow through each diode section of tubes 72 and 73, thereby causing the diode sections to offer a low impedance to received signal Fig. 3a during each pulse. In this matter the received signal is sampled during each pulse, and the voltage which appears on lead 78 during each sampling periods tends to equal the voltage of the received signal during the sampling period.

The low pass filter 14 preferably has a fairly long time constant. In an embodiment using a pulse rate of approximately 25 cycles per second, a filter time constant of approximately 14 seconds was found adequate. Alternate filters having time constants of 40 seconds and 100 seconds were found to have much smoother outputs. Generally speaking, the longer the time constant, the smoother the output will be. The output noise is substantially independent of the reference phase.

In specific embodiment, at a carrier to noise voltage ratio $$\frac{C}{N}=1$$

there was negligible suppression, whereas the conventional diode detector at the same carrier to noise ratio $$\frac{C}{N}=1$$

showed quite objectionable suppression.

With a carrier to noise ratio of approximately 1/10

$$\frac{C}{N}=1/10$$

a diode detector was found to be practically useless, whereas the results obtained by the sampling detector of the present invention were good.

With a carrier to noise ratio of 1/20

$$\frac{C}{N}=1/20$$

the diode detector did not provide any signal at all over the noise, whereas the sampling system of the present invention provide a useable signal. Therefore, it appears that a non-suppressing detector of the sampling type as disclosed, will give useable results down to a carrier to noise ratio of 1/20

$$\frac{C}{N}=1/20$$

providing a filter time constant of about 100 seconds is acceptable operationally. Based on a prevailing noise density of .05 microvolt/meter per square root of bandwidth, this means that ideally, a carrier field strength of only .013 microvolt/meter would be sufficient to obtain a signal to noise ratio of 5 at the indicator.

The present invention is not limited to loran type systems which have been used merely as an illustration. The sampling apparatus of the present invention may be used wherever the received radio fraquency has a constant or known phase. Various alternatives may be substituted for various elements in the disclosure, for instance, the sampling gate 12 may be any type switch which has a fast enough response time, and various well known circuits may be used in pulse generator 20. The phase synchronized local oscillator 15 may also utilize any type oscillator circuit provided it is sufficiently stable and adapted to be synchronized with a received signal.

What is claimed is:

1. A pulse receiver comprising in combination, tuned radio-frequency amplifier means for amplifying recurrent pulse modulated radio-frequency signals, an electronic switch connected to the output of said tuned radio-frequency amplifier means and receiving said amplified pulse modulated radio-frequency signals, pulse producing means coupled to said electronic switch, said pulse producing means producing short output pulses at the recurrence frequency of the received pulse modulated radio-frequency signals, local oscillator means coupled to said pulse producing means for energizing said pulse producing means, means including a phase detector coupled to said radio-frequency amplifier means and said local oscillator means for synchronizing the frequency of said local oscillator means with the received radio-frequency carrier signal, the recurrent short output pulses from said pulse producing means being synchronized to the output of said local oscillator means for energizing said electronic switch at predetermined instants of time, said electronic switch sampling predetermined portions of said received pulse modulated radio-frequency signals, and low pass filter means coupled to the output of said electronic switch for storing the sampled portions of said received pulse modulated radio-frequency signals.

2. A radio-frequency receiver comprising in combination, a tuned radio-frequency amplifier for amplifying recurrent pulse modulated radio-frequency signals, switching means coupled to the output of said tuned radio-frequency amplifier and receiving said amplified pulse modulated radio-frequency signals, means producing short recurrent pulses whose pulse recurrence interval is equal to the pulse recurrence interval of the received pulse modulated radio-frequency signals, means coupled to said radio-frequency amplifier and including a radio-frequency oscillator for energizing said pulse producing means, said pulse producing means energizing said switching means to sample predetermined portions of said received radio-frequency signals, the phase of the energizing pulses from said pulse producing means being fixed relative to the phase of said pulse-modulated radio-frequency signals, said switching means sampling said received radio-frequency wave throughout approximately one-half cycle of the radio-frequency signal, and a low-pass filter coupled to the output of said switching means for storing the sampled portions of the radio-frequency signal.

3. A radio receiver for receiving recurrent pulse-modulated carrier wave signals comprising in combination, tuned radio-frequency amplifier means for amplifying said pulse-modulated carrier wave signals, a sampling gate detector coupled to the output of said tuned radio-frequency amplifier means for receiving said pulse-modulated carrier wave signals, pulse producing means coupled to said sampling gate detector for energizing said detector to sample the amplitude of portions of the radio-frequency cycles of said pulse-modulated carrier wave signals, said sampled portions each being less than one-half cycle of the radio-frequency carrier wave signal, and phase responsive means coupled to the output of said radio-frequency amplifier means and to said pulse producing means and responsive to the relative phase difference between said pulse-modulated carrier wave signals and the output of said pulse producing means, said phase responsive means maintaining the phase of the output pulses of said pulse producing means synchronized with said recurrent pulse-modulated carrier wave signals.

4. A radio-frequency pulse receiver comprising tuned radio-frequency amplifier means for amplifying recurrent pulse-modulated radio-frequency signals, an electronic switch coupled to the output of said tuned radio-frequency amplifier means for receiving said amplified pulse-modulated radio-frequency signals, pulse producing means coupled to said electronic switch for energizing said switch to sample predetermined portions of the radio-frequency cycles of said received radio-frequency signals, a local oscillator coupled to said pulse producing means, synchronizing means coupled to said local oscillator and said tuned radio-frequency amplifier means for maintaining the phase of the energizing pulses from said pulse producing means synchronized with the phase of the radio-frequency carrier wave signals, and a low-pass filter coupled to the output of said electronic switch for storing the sampled portions of the pulse-modulated radio-frequency signals.

References Cited in the file of this patent
UNITED STATES PATENTS

| | | |
|---|---|---|
| 2,413,023 | Young | Dec. 24, 1946 |
| 2,416,089 | Jones | Feb. 18, 1947 |
| 2,430,139 | Peterson | Nov. 4, 1947 |
| 2,505,040 | Goodall | Apr. 25, 1950 |
| 2,531,433 | Hoffman et al. | Nov. 28, 1950 |
| 2,532,338 | Schlesinger | Dec. 5, 1950 |
| 2,565,504 | Labin et al. | Aug. 28, 1951 |